United States Patent [19]

Hartzell

[11] Patent Number: 5,555,627
[45] Date of Patent: Sep. 17, 1996

[54] D-SHAPED HANDLE FOR COPING SAWS

[76] Inventor: Mark Hartzell, 6525 W. County Line Rd., Brown Deer, Wis. 53223

[21] Appl. No.: 523,563

[22] Filed: Sep. 5, 1995

Related U.S. Application Data

[63] Continuation of Ser. No. 290,350, Aug. 15, 1994, abandoned.

[51] Int. Cl.$^6$ .................................................. B23D 51/01
[52] U.S. Cl. ................................................ 30/509; 30/517
[58] Field of Search .......................... 30/507, 509, 513, 30/514, 517, 519, 521–524; D8/95, 96, 97

[56] References Cited

U.S. PATENT DOCUMENTS

| | | | |
|---|---|---|---|
| 65,947 | 6/1867 | Richardson | 30/507 |
| 321,119 | 10/1991 | Ciccone et al. . | |
| 806,033 | 11/1905 | Wettich et al. | 30/513 |
| 1,100,305 | 6/1914 | Howell . | |
| 1,470,040 | 10/1923 | Whitehead . | |
| 1,518,488 | 12/1924 | Dandrea | 30/513 |
| 2,012,201 | 8/1935 | Okros | 30/513 |
| 2,014,722 | 9/1935 | Damon . | |
| 2,204,390 | 6/1940 | Albright | 30/513 |
| 2,303,705 | 12/1942 | Persson . | |
| 2,710,032 | 6/1955 | Clark . | |
| 3,329,186 | 7/1967 | David | 30/513 |
| 3,815,648 | 6/1974 | Dreier . | |

FOREIGN PATENT DOCUMENTS 100130  10/1940  Sweden .................................. 30/517

*Primary Examiner*—Hwei-Siu Payer
*Attorney, Agent, or Firm*—Whyte Hirschboeck Dudek S.C.

[57] ABSTRACT

The present invention provides a symmetric, D-shaped handle for use with coping and similar saws which are generally comprised of a saw blade attached to a U-shaped frame having first and second shanks. The handle is comprised of a perpendicular cross-member mounted between the two shanks of a C-shaped member. The cross-member, which is used for gripping, is maintained substantially perpendicular to the saw blade while the planes of the saw frame shanks remain substantially parallel to the cross-member. At the center point of the C-shaped member is an aperture to allow the D-shaped handle to slide onto the threaded shaft of a standard blade holder. A standard fastener such as a wing nut may then be threadingly engaged with the shaft to attach and tighten the handle onto the shaft and simultaneously tension and align the saw blade between the shanks of the saw frame. In another embodiment, the aperture is slot-shaped to allow the handle to be pivoted into a pistol grip position when the operator desires to make continuous cuts in only one direction. In still yet another embodiment, the aperture in the D-shaped member is shaped and formed to be coupled with a protrusion on the shaft of a standard blade holder of a coping saw, thus preventing the handle from rotating about the shaft of the blade holder during use.

12 Claims, 2 Drawing Sheets

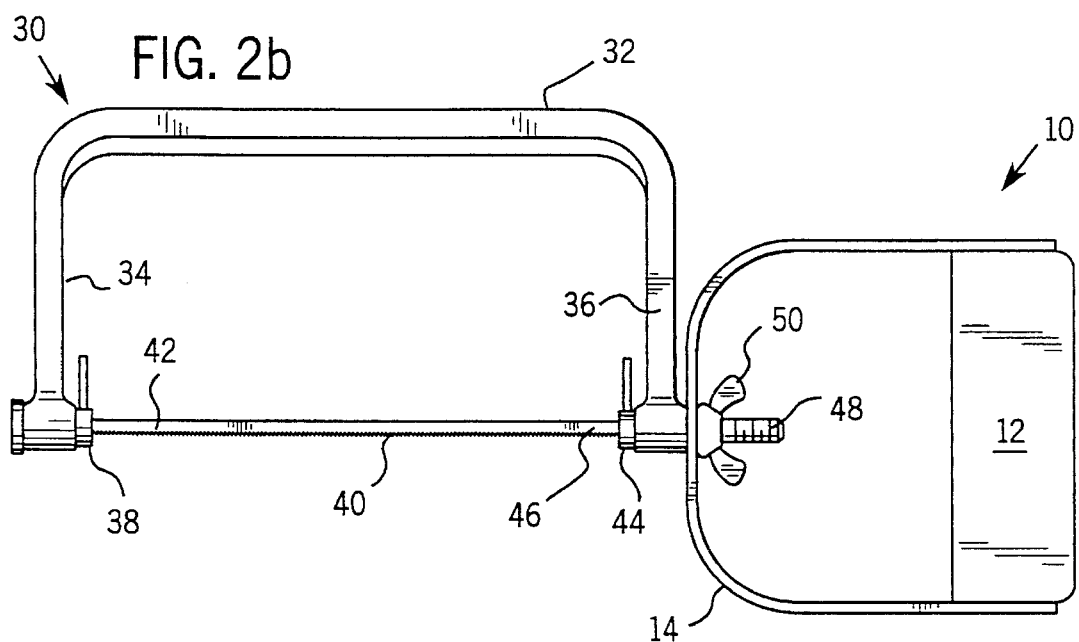
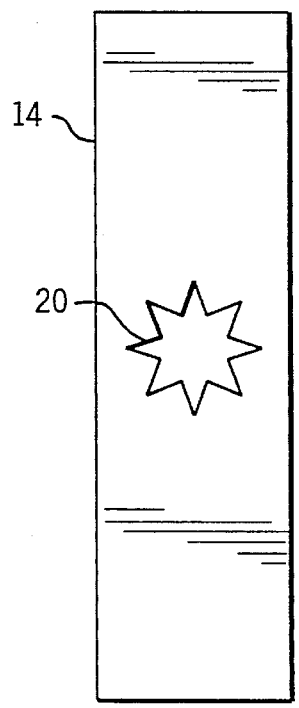
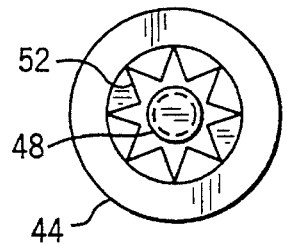

D-SHAPED HANDLE FOR COPING SAWS

This is a continuation of application Ser. No. 08/290,350 filed on Aug. 15, 1994, now abandoned.

BACKGROUND OF THE INVENTION

1. Field of the Invention

This invention relates to the field of hand saws and more particularly, to a D-shaped handle for coping saws.

2. Description of the Prior Art

Coping saws have been prevalent in the prior art for some time. The earliest forms utilized the characteristic bulbous straight handle as an auxiliary handle and as a means of rotating the saw blade relative to the saw frame. Initially, the frame was grasped to transfer force to the cutting edge of the blade and to move the cutting edge across a work surface. In these early designs, two bulbous straight handles were located on opposite shanks of an open, rectangular shaped frame so that a blade held between the two shanks could be axially rotated by rotating the handles. To effect a cut, rotation of the blade was often necessary so that the saw frame did not interfere with the stroke. Today, the form of coping saw which is most prevalent utilizes a bulbous straight handle for three functions: 1) as a means for tightening a blade on a U-shaped frame; 2) as a means for transferring downward force to the blade during the cutting stroke; and 3) as a means for rotating the blade relative to the saw frame. Specifically, the first end of the blade is rotatingly attached to the first open end (shank) of the U-shaped frame. The second end of the blade is held by a blade holder which has a threaded shaft extending through an opening on the opposite, second open end (shank) of the frame. The bulbous handle is axially threaded to allow it to engage the threaded shaft so that as the handle is tightened on the shaft, the blade is tensioned between the first and second shanks of the frame. In this configuration, the axis of the handle is aligned with the axis of the blade, and the blade can be rotated relative to the frame to allow the frame to be positioned so as not to interfere with a cut.

Straight handles such as the one described above are undesirable because of the rapid fatigue of the hand created by the unnatural and extended position of the hand as it grasps the handle. Specifically, when grasping a straight handle, at least the thumb, index finger and the middle finger must apply a pinching grip to the handle, while at the same time the muscles in the outer portion of the hand are extended. This exertion often results in fatigue and soreness of the muscles in the hand and wrist. In day to day use, this strain on the hand and wrist can lead to Carpal tunnel syndrome, a condition that can permanently damage the nerves of the hand and wrist.

Additionally, this type of grip may inhibit the user from taking advantage of the faster cutting, coarser-toothed blades because the operator is unable to adequately transfer force to the cutting edge of the blade while maintaining control of the saw. Typically, a slow cutting, 20 teeth per inch (TPI) blade is used for the most demanding copes in terms of effort and skill. Sometimes, a 15 TPI blade may be used, but rarely is the fastest cutting, 10 TPI blade used because it is difficult to maintain a grip on the straight handle and attain the leverage needed to direct the cut with such coarse blades. It is not unusual for coarser-toothed blades to become jammed in the saw kerf such that the user loses grip of the handle.

One type of handle which is old and well known in the art for use with other types of saws is the pistol grip handle. This type of handle has been utilized to increase the downward force which can be applied to the cutting edge of a saw blade so that cutting times can be decreased. Pistol grip handles also reduce a portion of the hand fatigue associated with the use of straight handles. The prior art is replete with examples of pistol grip handles, especially in combination with hacksaws. U.S. Pat. No. 1,470,040, issued to Whitehead, teaches a pistol grip handle which can be affixed to a bulbous straight handle to convert the straight handle to a pistol grip. The ends of the pistol grip are clamped around the straight handle and secured with fasteners so that the pistol grip handle angles down and away from the straight handle in the same plane as the saw blade. One drawback to this handle is that such a handle is difficult to manipulate because it attaches in line with the axis of the blade and extends down from this axis, creating a moment about the point of attachment.

U.S. Pat. No. 2,014,722, issued to Damon, describes a pistol grip handle which can be permanently attached to a standard U-shaped or L-shaped hacksaw frame. The handle is rigidly fixed at two points on the upper corner of the frame such that the portion of the handle which is gripped extends downward, adjacent the frame and in the same plane as the frame and the saw blade. The handle is formed of strip steel of U-shaped cross section so that it is resilient and will yield slightly in the grip of the hand to avoid fatigue.

Another pistol grip handle is disclosed in U.S. Pat. No. 2,303,705. Again, the handle is rigidly fixed to a saw frame at two points on the frame so that the handle is angled down and away from the saw blade in the same plane as the blade. At least one shank of the handle is intended to be fixed to the saw frame under a certain degree of strain so that the handle has a certain inherent springiness.

Although the above mentioned pistol grip handles generally provide the optimum transfer of force to cutting blades, the angle of these handles relative to the saw blades limits the operators' ability to manipulate the saws to effect various cuts. Specifically, pistol grip handles are oriented on a downward angle, sloping away from the saw blade. This configuration facilitates cuts made in only one direction, i.e., toward the operator. When a pistol grip handle is properly grasped, the cutting edge of the saw must be substantially parallel with the operator's forearm, making it difficult and very uncomfortable to grip the saw handle and make a cut away from the operator.

However, because of the delicate and intricate nature of the work performed with coping saws, the required cuts are often multi-directional, such that the direction of the blade relative to the operator must often be altered to complete the cut. Although it is most desirable to make a single, uninterrupted cut, pistol grip handle saws render such a task difficult because of the manner in which the handle is grasped by the operator. Therefore, an operator may be required to interrupt a cut and reposition the saw blade to complete the cut. For example, if an operator is cutting a 180 degree symmetric curve, a first cut may be made toward the operator through the first 90 degrees of the arc. At this point along the cut, the cutting is interrupted and the saw is repositioned so that a second cut through the remaining 90 degrees can also be made toward the operator. Interrupting cutting, backing the saw blade out of the cut and repositioning the saw in the manner is often tedious and time consuming. Thus, these types of handles make it difficult to complete a single cut without interrupting the cut to reposition the saw and handle relative to the operator. Pistol grip handles, therefore, would be of little used in combination with coping saws or similar saws which are used to make multidirectional cuts.

Therefore, it is desirable to provide a handle for coping and similar saws which maximizes the force applied to the cutting edge of a saw blade, while minimizing hand fatigue. The handle should be easily manipulated for multidirectional cuts without the need for interrupting the cut to reposition the saw. It is further desirable to provide a handle which can be attached to a standard U-framed coping saw such that the handle can be rotated with the saw blade relative to the frame. Additionally, such a handle should be inexpensive and easily attached.

SUMMARY OF THE INVENTION

The present invention provides a handle for coping and similar saws wherein the handle is perpendicular to the axis of the saw blade and attached at a single point to the saw allowing the handle to be rotated in conjunction with the saw blade. Specifically, a D-shaped handle is provided wherein a perpendicular cross member is mounted between the two shanks of a C-shaped member. At the center point of the C-shaped member, the C-shaped member has an aperture to allow the handle to slide onto the threaded shaft of a standard blade holder. A standard fastener such as a wing nut may then be threadingly engaged with the shaft to tighten the handle onto the shaft and simultaneously tension the saw blade between the shanks of the saw frame.

In another embodiment, the aperture in the C-shaped member is a slot so that the handle can be pivoted about the shaft, allowing the grip of the handle to be oriented to permit the operator to maximize the amount of force transferred to the cutting edge of the saw blade when a cut is being made in a single direction, such as toward the operator.

In yet another embodiment, the aperture in the C-shaped member is formed to be coupled with a protrusion on the blade holder, thus preventing the handle from rotating about the shaft of the blade holder during sawing. The coupling may have various shapes, such as ribs and grooves, so that the handle can be rotated and fixed at defined intervals about the blade holder shaft.

BRIEF DESCRIPTION OF THE DRAWINGS

In the drawings which illustrate those which are presently regarded as the best modes for carrying out the invention:

FIG. 2b shows the handle of FIG. 1 attached to a coping saw in which the handle and the saw blade have been rotated relative to the frame.

FIGS. 3a and 3b show an end view of the blade holder and C-shaped member in a handle employing a ribbed coupling.

DESCRIPTION OF THE PREFERRED EMBODIMENT

Figure 1:
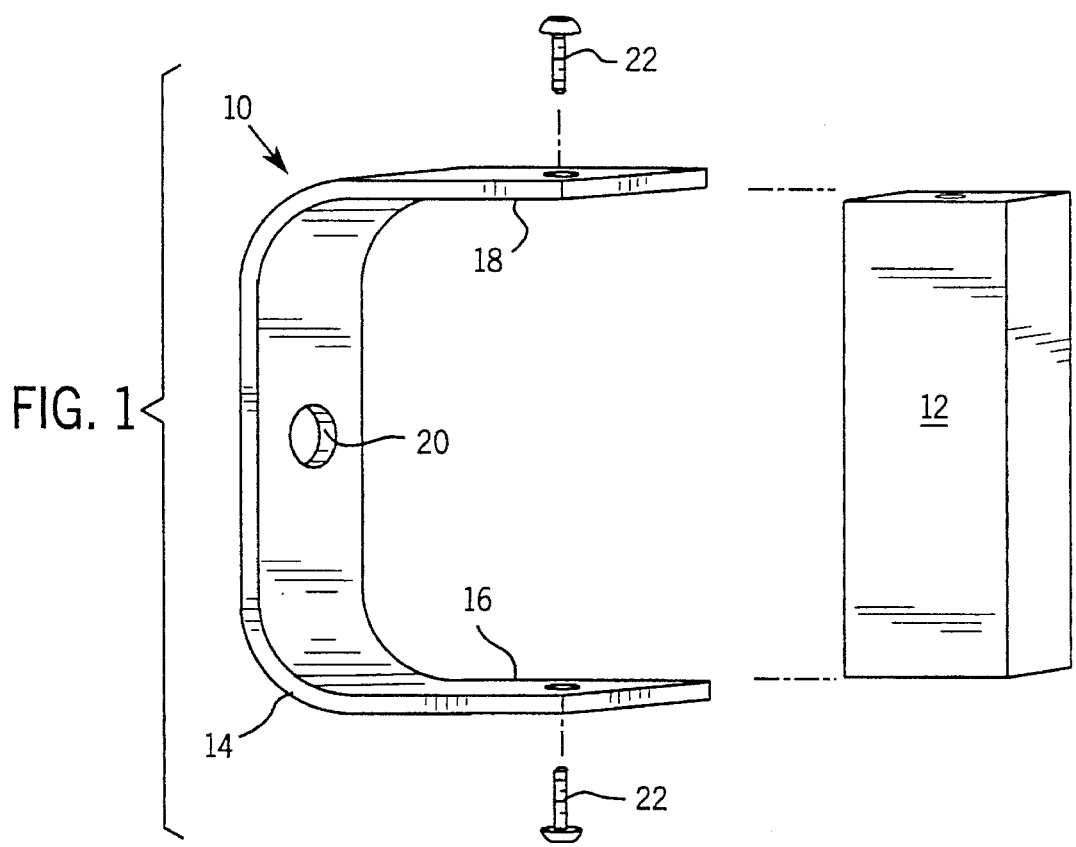
FIG. 1 shows an exploded, elevational side view of the D-shaped handle.

In FIG. 1, a D-shaped handle is shown and generally designated as 10. Handle 10 is comprised of a vertical cross member 12 and a C-shaped member 14. C-shaped member 14 is further defined by a first shank 16 and a second shank 18. An aperture 20 through the face of C-shaped member 14 is provided at its middle point. Cross member 12 is attached by any standard means between first shank 16 and second shank 18. In the preferred embodiment, countersunk screws 22 are used to attach cross member 12 to C-shaped member 14.

Figure 2A:
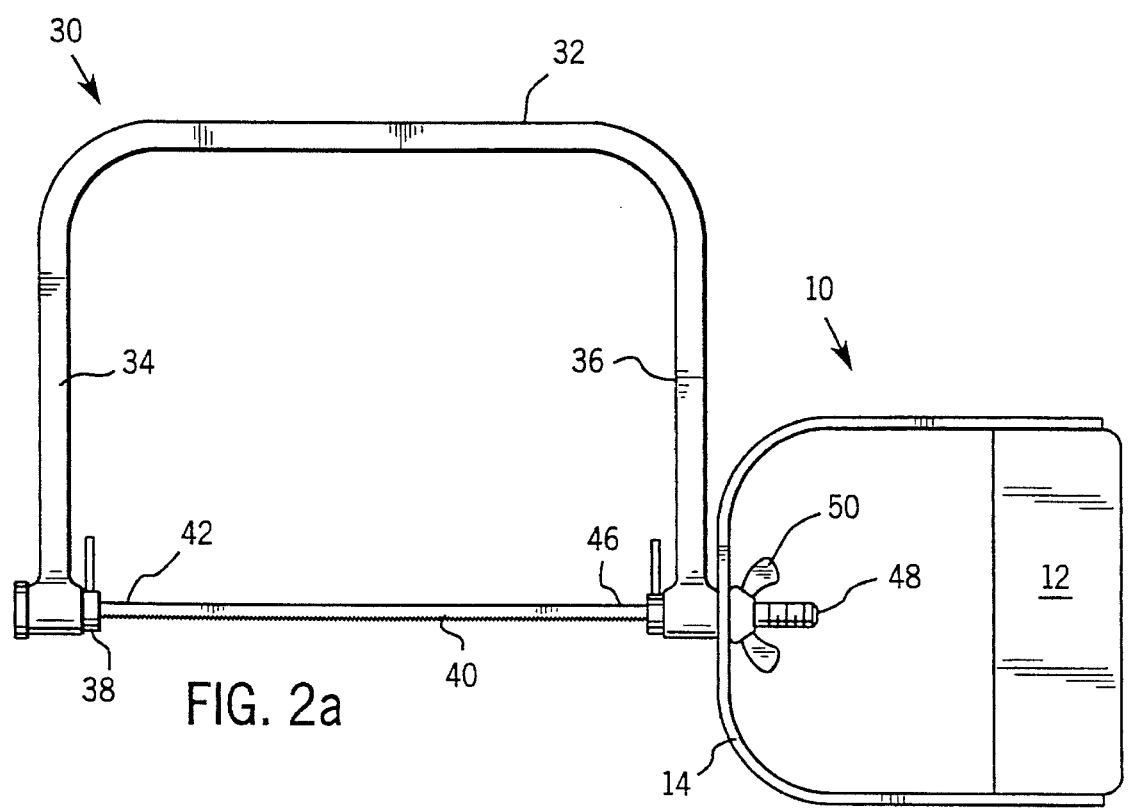
FIG. 2a shows the handle of FIG. 1 attached to a coping saw so that the handle, saw blade and the frame of the saw are aligned in the same plane.

Turning to FIGS. 2a and 2b, D-shaped handle 10 is shown attached to coping saw 30. Coping saw 30 is of standard design and includes a C-shaped frame 32 having a first frame shank 34 and a second frame shank 36. A first blade holder 38 is rotatingly mounted on first frame shank 34 and engages saw blade 40 at the forward end 42 of the blade. A second blade holder 44 similarly engages saw blade 40 at its rear end 46. Second blade holder 44 is rotatingly mounted on second frame shank 36 and is provided with a threaded shaft 48 which extends through aperture 20 (FIG. 1) in C-shaped member 14. First and second blade holders 38, 44 shown in FIG. 2 are of standard design and will not be further described herein.

D-shaped handle 10 is joined with coping saw 30 by sliding threaded shaft 48 through aperture 20 (FIG. 1) and threadingly engaging wing nut 50 with shaft 48. Wing nut 50 is tightened on shaft 48 until C-shaped member 14 is adjacent second frame shank 36 and saw blade 40 is properly tensioned between first and second frame shanks 34, 36.

The preferred embodiment described herein allows handle 10 to remain perpendicular to saw blade 40 at all times. This special relationship permits the user to apply the greatest amount of force to saw blade 40 while minimizing hand strain and permitting an operator to follow a cut through multiple direction changes. Thus, a continuous, uninterrupted cut can be made without the need to reposition the saw each time a cut changes direction. Also, D-shaped handle 10 requires only gripping and alleviates strain which can occur when pinching is necessary (such as on a straight handle). Additionally, the symmetric position of handle 10 about the linear axis of saw blade 40 is the least demanding on the wrist because the wrist is naturally balanced. Therefore, fatigue of the wrist and hand is minimized by both the perpendicular relationship of saw blade 40 to handle 10 and the symmetric position of handle 10 about the axis of saw blade 40.

Furthermore, as illustrated in FIG. 2b, the symmetric positioning of handle 10 allows handle 10 to be rotated about the axis of saw blade 40 so that cross member 12 remains in the same plane as saw blade 40. In other words, the main axis of cross member 12 is vertically maintained in relation to the direction of cut. This relationship has been found to be most satisfactory in transferring power and maintaining control because the palm of the hand is vertical when the wrist is in its natural position. Therefore, control and power can be maintained no matter how saw blade 40 is positioned relative to U-shaped frame 32.

In a second embodiment, aperture 20 is a slot extending along the surface of C-shaped member 14 towards the ends of first and second shanks 16, 18. When shaped like a slot, aperture 20 permits D-shaped handle 10 to be pivoted about threaded shaft 48 so that cross member 12 can oriented on a downward angle, sloping away from saw blade 40 in a configuration similar to pistol grip handles. When the operator desires to make a cut in only a single direction, such as toward the operator, D-shaped handle 10 can be pivoted from a symmetric position about threaded shaft 48 to a position which is more optimal for cutting in a single direction.

Those skilled in the art will understand that the shape of shaft 48 and the corresponding shape of aperture 20 may take many different forms. For example, shaft 48 and aperture 20 may have a square shape so that D-shaped handle 10 does not rotate about shaft 48 during use of saw 30. Another example is illustrated in a third embodiment seen in FIGS. 3a and 3b. In this embodiment, aperture 20 in C-shaped member 14 (FIG. 3a) is formed to be coupled with a protrusion 52 located at the base of shaft 48 (FIG. 3b). Again, although the shape of aperture 20 and protrusion 52 may take many different forms, in the embodiment shown, protrusion 52 is ribbed and aperture 20 is correspondingly grooved so that handle 10 (FIGS. 2a and 2b) can be rotated and fixed at defined intervals about blade holder shaft 48. Such a configuration prevents handle 10 from inadvertently rotating about shaft 48 should wing nut 50 become loose, yet allows the angular position of handle 10 to be adjusted to suit the requirements for a particular cope.

Although the attachment of saw blade 40 to C-shaped frame 32 is accomplished with the first and second blade holders 38, 44 shown in FIGS. 2a and 2b, those skilled in the art will understand that the attachment of saw blade 40 to C-shaped frame 32 can be accomplished in many different ways while still permitting handle 10 to be affixed as described herein.

Additionally, those skilled in the art will understand that D-shaped handle 10 of the present invention can be used with any saw that is used to accomplish the types of cuts herein described. For example, D-shaped handle 10 may be combined with a fret saw or a jeweler's saw.

D-shaped handle 10 can be of any suitable material, such as metal, wood or plastic. Further cross member 12 may be provided with grooves (not shown) that conform to the shape of the hand to provide additional comfort.

Although the invention has been described in considerable detail through the figures and above discussion, many variations and modifications can be made by one skilled in the art without departing from the spirit and scope of the invention as described in the following claims.

What is claimed is:

1. A coping saw comprising:
  a) a D-shaped handle, further comprising:
    I) a C-shaped member having first and second shanks and an aperture; and
    ii) a cross-member attached to at least one of said first and second shanks;
  b) a U-shaped saw frame having first and second frame shanks;
  c) a saw blade;
  d) means for securing said saw blade between said first and second frame shanks; and
  e) means for attaching said D-shaped handle to said means for securing,
  wherein said cross-member is substantially perpendicular to said saw blade such that said D-shaped handle is substantially symmetric about said means for attaching.

2. The saw of claim 1, wherein said aperture is located at the mid-point of said C-shaped member.

3. The saw of claim 1, wherein said aperture is slot-shaped.

4. The saw of claim 1 wherein said means for attaching is further provided with a protrusion for engagement with said aperture.

5. The saw of claim 4 wherein said protrusion and said aperture are star-shaped.

6. An improved coping saw having a U-shaped frame, a saw blade, a means for attaching said blade to the U-shaped frame, wherein the improvement comprises:
  a) a removable D-shaped handle, further comprising:
    i) a C-shaped member having first and second shanks and an aperture for removably attaching the D-shaped handle to the U-shaped frame; and
    ii) a cross-member attached to at least one of said first and second shanks,
    wherein said cross-member is substantially perpendicular to said saw blade such that said D-shaped handle is substantially symmetric about said means for attaching.

7. The saw of claim 6, wherein said aperture is located at the mid-point of said C-shaped member.

8. The saw of claim 6 wherein said means for attaching is further provided with a protrusion for engagement with said aperture.

9. The saw of claim 8 wherein said protrusion and said aperture are star-shaped.

10. The saw of claim 6, wherein said aperture is slot-shaped.

11. A jeweler's saw comprising:
  a) a D-shaped handle, further comprising:
    i) a C-shaped member having first and second shanks and an aperture; and
    ii) a cross-member attached to at least one of said first and second shanks;
  b) a U-shaped saw frame having first and second frame shanks;
  c) a saw blade;
  d) means for securing said saw blade between said first and second frame shanks; and
  e) means for attaching said D-shaped handle to said means for securing,
  wherein said cross-member is substantially perpendicular to said saw blade such that said D-shaped handle is substantially symmetric about said means for attaching.

12. A fret saw comprising:
  a) a D-shaped handle, further comprising:
    i) a C-shaped member having first and second shanks and an aperture; and
    ii) a cross-member attached to at least one of said first and second shanks;
  b) a U-shaped saw frame having first and second frame shanks;
  c) a saw blade;
  d) means for securing said saw blade between said first and second frame shanks; and
  e) means for attaching said D-shaped handle to said means for securing,
  wherein said cross-member is substantially perpendicular to said saw blade such that said D-shaped handle is substantially symmetric about said means for attaching.

* * * * *